United States Patent Office 3,356,600
Patented Dec. 5, 1967

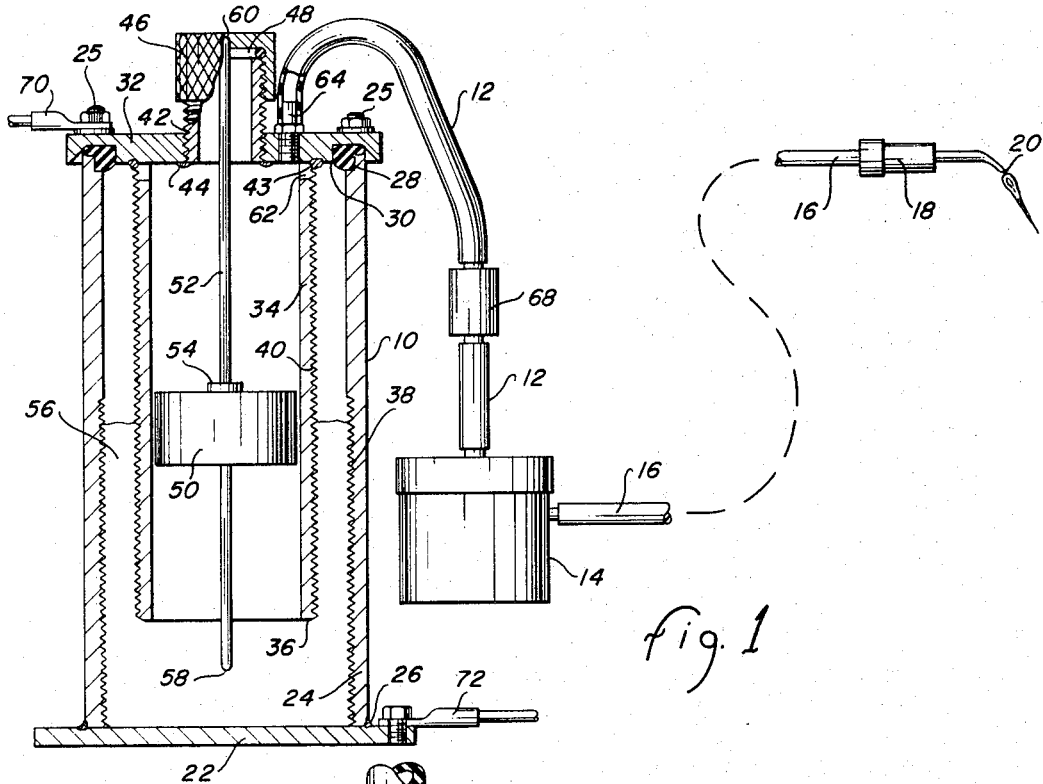
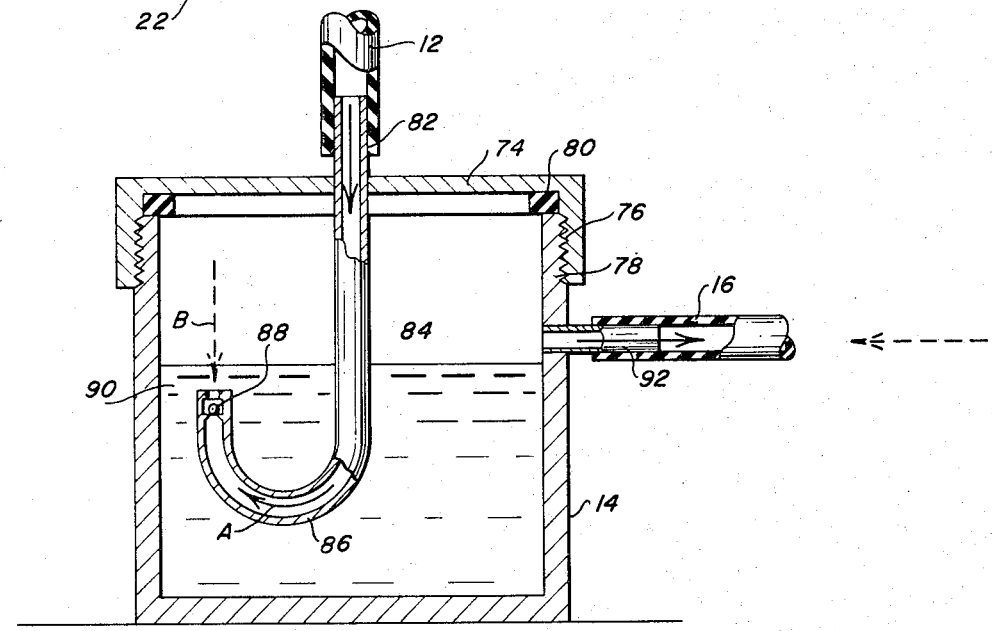

3,356,600
MEANS AND METHOD FOR PRODUCING A DRY HOMOGENEOUSLY MIXED HYDROGEN AND OXYGEN FUEL GAS FOR TORCHES
Richard W. Henes, Phoenix, Ariz., assignor to Henes Manufacturing Co., Phoenix, Ariz., a corporation of Arizona
Filed Dec. 24, 1963, Ser. No. 333,084
2 Claims. (Cl. 204—129)

ABSTRACT OF THE DISCLOSURE

A means and method for producing a dry homogeneously mixed hydrogen and oxygen fuel gas for torches, wherein hydrogen and oxygen is electrolytically produced and passed through a passage means having a dryer in the flow path of the gases to remove water therefrom, and the passage of the gases through a small diameter torch orifice ranging from .003 inch to .050 inch, and then creating combustion of the dry mixture to produce a high velocity high temperature flame.

This invention relates to a means and method for producing and burning a dry homogeneously mixed hydrogen and oxygen fuel gas for torches.

In the operation of electrolytic hydrogen and oxygen gas generators, small amounts of water vapor may be entrained in such gases delivered from an electrolytic generator.

This water vapor tends to cool an area of combustion of the hydrogen and oxygen gases when used as a torch fuel. Consequently, the water vapor at the point of combustion lowers the temperature of the flame which could otherwise be produced by the combustion of hydrogen and oxygen.

In the operation of hydrogen and oxygen torches having very small diameter flames, the entrainment of water vapor in the gases creates considerable problems when it is recognized that the water vapor absorbs 539 calories per gram, which represents the heat of vaporization at the boiling point of the water vapor. Thus, the flame temperature of very small flames produced by combustion of such gases is seriously impaired. Additionally, the water vapor entrained in the gases may carry various impurities, which may impair the quality of a weld or braze structure being produced by operation of the torch utilizing the hydrogen and oxygen gases. Additionally, it has been recognized that hydrogen and oxygen gases, when utilized as torch fuel, produce extremely high temperatures and these gases may be utilized in producing very small diameter flames, and accordingly, the entrainment of water vapor seriously impairs the attainment of the high temperature in such small diameter flames so as to reduce the effectiveness of combustion to produce extremely high temperatures at the flame cone adjacent to a torch.

It has also been found that the entrainment of water may surround the cone of hydrogen and oxygen gas mixtures emitted from a torch whether the torch diameter be very small or relatively large, whereby the water vapor surrounding the flame cone may have serious thermal shock effects upon materials being heated by a flame produced by the gases.

Another problem which becomes apparent when water vapor is entrained in a hydrogen and oxygen gas mixture is that the water vapor tends to reduce the temperature of the flame and, consequently, its relative velocity, and, accordingly, the heat transfer rate to a work piece is reduced since the rate of heat application is a function of flame velocity.

Accordingly, it is an object of the present invention to provide a novel means and method for producing a dry homogeneously mixed hydrogen and oxygen fuel gas for torches whereby a homogeneous mixture of hydrogen and oxygen gases is efficiently dried free of water vapor so that it may be emitted from a torch tip and produce a very high temperature high velocity flame, particularly useful for welding, brazing, and other similar uses.

Another object of the invention is to provide a means and method for producing a dry homogeneously mixed hydrogen and oxygen fuel gas for torches which delivers at a torch tip a homogeneous mixture of hydrogen and oxygen gas which is free of impurities and water vapor, and which may therefore be used to produce a very high temperature high velocity flame of very small diameter capable of being employed in very exacting work.

Another object of the invention is to provide a means and method for producing a dry homogeneously mixed hydrogen and oxygen fuel gas for torches comprising an electrolytic hydrogen and oxygen gas generator having an outlet communicating through a water collector containing a drying agent, whereby water vapor is removed from the hydrogen and oxygen gas along with impurities carried by such vapor so that a pure homogeneously mixed hydrogen and oxygen gas fuel may be delivered to a torch for producing a very high velocity high temperature flame.

Another object of the invention is to provide a means and method for producing a dry homogeneously mixed hydrogen and oxygen fuel gas for torches which is very simple and economical to produce and operate, and which is particularly adapted for producing very small diameter high temperature high velocity flames which are useful to accomplish intricate welding or brazing operations on miniaturized equipment, such as electronics equipment, or the like.

Another object of the invention is to provide a means and method for producing a dry homogeneously mixed hydrogen and oxygen fuel gas for torches wherein an electrolytic hydrogen and oxygen gas generator produces and delivers a mixture of hydrogen and oxygen gas through a sump wherein a chemical water collector, such as calcium chloride monohydrate or an aquivalent drying agent is located, whereby water vapor is absorbed from the gases along with impurities carried by the water vapors so that the mixture of hydrogen and oxygen gases, when proceeding to a flame torch, are efficiently purified.

Further objects and advantages of the invention may be apparent from the following specification, appended claims and accompanying drawings in which:

FIG. 1 is a side elevational view of a means for producing a dry homogeneously mixed hydrogen and oxygen fuel gas for torches in accordance with the present invention, and showing structure of an electrolytic gas generator and dryer in section to amplify the illustration; and FIG. 2 is an enlarged sectional view of a drying tank in accordance with the invention wherein a flow of hydrogen and oxygen gases may be passed through a drying agent or water collector before the gases reach a torch for combustion.

Referring to FIG. 1 of the drawings, it will be seen that the invention comprises an electrolytic gas generator 10 having a hydrogen and oxygen gas delivery conduit 12 which delivers gas into a drying tank 14 from which the gases pass through a flexible conduit 16 to a torch 18 provided with a gas emitting tip 20.

Referring to FIG. 1 of the drawings, it will be seen that the generator is provided with a base plate 22 to which is welded an upstanding hollow cylindrical generator casing 24 which serves as a reactor cathode for electrolytic production of oxygen, as will be hereinafter described. This casing 24 is preferably made of steel pipe or tubing, and is peripherally welded at 26 to the base plate 22.

The upper annular edge of the casing 24 is engaged with a sealing gasket 28 held in a groove 30 of a cover 32 to the lower side of which is welded a hollow tubular reactor anode 34. This anode 34 is preferably made of steel pipe or tubing and is suspended concentrically in the outer casing 24 and provided with a lower end 36 spaced from the upper surface of the base plate 22, all as shown best in FIG. 1 of the drawings.

The casing 24 is provided with an internally threaded wall 38. Conventional screw threading of this wall 38 provides extended surface area thereof for a large volume production of hydrogen in proportion to the overall external dimensions of the casing 24.

It will be understood that the extended surface area of the internal wall 38 of the casing 24 may be provided by other means than the screw threads, as for example, inwardly directed fins, or the like. The annular construction of the casing 24 is very readily provided with an internal screw thread, which is the simplest manner of extending the cathode surface area of the generator.

The reactor anode 34 is provided with external annular screw threads 40 to extend the surface area of the anode for the production of a maximum amount of oxygen in proportion to the size of the generator.

It will be obvious to those skilled in the art that since the reactor anode 34 is annular that external annular fins may be provided in lieu of the screw threads hereinbefore described.

The upper end of the tubular anode structure 34 is welded at 43 to the cover 32 and the gasket 30 acts to insulate the cover 32 from the cathode casing 24, as will be hereinafter described. The cover 32 is clamped to the cathode casing by electrically insulated bolts 25.

Concentrically of the cover 32 is a filler neck 42 of hollow cylindrical construction which is peipherally welded at 44 in a central opening in the cover 32.

A cap 46 is screw threaded on the neck 42 and is provided with a gasket 48 forming a sealing engagement of the cap 46 with the upper end of the filler neck 42.

Disposed concentrically and internally of the hollow cylindrical anode 34 is a float 50 preferably made of styrofoam or any other suitable material which will float on electrolytes in the generator.

The float 50 is mounted on a rod 52 having a shoulder 54 thereon against which the float 50 moves upwardly while supported on the electrolyte 56 in a generator.

The rod 52 is provided with a lower end 58 which may engage the base plate 22 when the electrolyte 56 is at low level. The rod 52 is also provided with an upper end 60 which may be level with the upper end of the filler neck 42 when the electrolyte 56 is at a proper level in the generator. Thus, the addition of water through the filler neck may be continued until the float 50 rises to carry the upper end 60 of the rod 52 to a position which is substantially level with the upper end of the filler neck 42. Thus, the generator is charged with the proper amount of water so that the electrolyte is at a proper concentration and capable of electrolyzing water to produce hydrogen and oxygen gases.

The cathode casing 24 at its internal screw threads 38 generates hydrogen which passes upwardly as indicated by arrows in FIG. 1 of the drawings, said hydrogen being produced on an extended surface area of the threads 38 while comparable action of the anode on its external screw thread portions 40 produces oxygen, and these gases mix above the electrolyte 56 and pass upwardly through an opening 62 in the side wall of the reactor anode adjacent the cover plate 32. Thus, the gases pass inwardly to the interior of the anode 34 and pass outwardly through a tube fitting 64 screw threaded in the cover 32.

The hereinbefore described tube 12 is coupled to the fitting 64 and this tube or conduit 12 extends to a flame flash back arrestor casing 68 having a porous stone therein through which the mixture of hydrogen and oxygen gases passes on the way to the drying casing 14 hereinbefore described.

The electrolyte 56, hereinbefore described, is a conventional electrolyte material, and may be in accordance with such electrolyte known in the prior art.

As shown in FIG. 1, an electrical conductor 70 is connected to the cover 32, while another electrical conductor 72 is connected to the base plate 22, thus, to provide a source of electrical energy respectively connected to the anode and the cathode, hereinbefore described.

The dryer or water collector casing 14 is provided with a cover 74 having an internally screw threaded flange 76 which is externally screw threaded on a complemental thread 78 externally of the upper end of the tank 14. A gasket 80 is interposed between the cover 74 and the upper end of the tank 78 to provide a seal. The conduit 12 is sealed to a conduit 84 at 82 and communicates with the downwardly directed conduit portion 84 having an upwardly turned section 86 wherein a check valve 88 permits flow in a direction of an arrow A and prevents backflow in direction of a broken line arrow B. Thus, this check valve 88 permits the flow of hydrogen and oxygen gases into the dryer casing 14 wherein the drying agent 90 is disposed. This drying agent 90 may comprise calcium chloride monohydrate $(CaCl_2.H_2O)$. Other useful drying agents are as follows: Phosphorous oxide $(P_2O_5)$; barium oxide (BaO); magnesium dichlorate $Mg(ClO_4)_2$; potassium hydroxide (KOH); sulphuric acid $(H_2SO_4)$; calcium sulphate $(CaSO_4)$; calcium chloride, etc. It will be obvious to those skilled in the art that any equivalent materials may be used, and that when the hydrogen and oxygen gases are directed through a layer of this material, or any other type of water collector, including centrifugal or mechanical absorbers, that water vapor entrained in the hydrogen and oxygen gases will be removed, and that the mixture of hydrogen and oxygen gases may then proceed outwardly through a fitting 92 and into the conduit 16 which extends to a torch 18 having a flame emitting tip 20.

As the dried hydrogen and oxygen gas mixture passes through the tank 14, it is relieved of water vapor and impurities carried thereby and, thus, issues from the tip 20 in a dry homogeneously mixed condition so that the tip orifice may be very small, as for example, as small as .003 inch in diameter, if desired, and so that the dry gases may be combustible at very high temperatures and, consequently, may issue at very high velocities in a very small diameter flame.

It will be appreciated by those skilled in the art that such a flame produced by the dry hydrogen and oxygen gas mixture may be only a few thousandths of an inch in diameter, and due to its high temperature and high velocity and such small diameter, may be used to braze or fuse or weld very small and intricate parts without heating surrounding areas. For example, such small delicate high temperature high velocity flames may be used very effectively in fusion welding or brazing or silver soldering various minute electronic parts in very confined areas. Thus, the present invention fills a very critical need in the production of a great variety of structures.

The present invention includes a method which comprises the electrolytic production of hydrogen and oxygen from an aqueous electrolyte contained in a generator wherein some vapor of water is produced and carried in a mixture of hydrogen and oxygen gases from the generator. It will be seen that the present invention employs the generator hereinbefore described which delivers the hydrogen and oxygen gases in a common conduit, namely, the conduit 12, and the water vapor is entrained therein. The water vapor, however, is removed in the drying casing or chamber 14 along with any other impurities which may be carried by the vapor. Accordingly, the hydrogen and oxygen gas mixture is purified and cleaned so that subsequent usage of the gases at the torch tip 20 to produce a flame is not accompanied by any water vapor which would tend to evaporatively cool the flame and carry impurities into the gas flame and into a weld area which might be metallurgically damaged by the impurities or adversely affected thermally by the water vapor issuing in surrounding relationship with the flame cone. It will be appreciated by those skilled in the art that the water vapor might absorb approximately 539 calories per gram, which is the heat of vaporization at the boiling point of the water vapor, and, accordingly, the elimination of the water vapor greatly increases the potential temperature and relative velocity of the torch flame emitted at the tip 20. Further, it will be appreciated that elimination of the water vapor and impurities carried thereby provides a fuel which may efficiently be passed through a very small torch orifice. The water is, thus, prevented from causing partial or intermittent restriction of flow through a small torch orifice ranging from .003 inch in diameter to .050 inch in diameter. Thus, it will be appreciated that water vapor elimination from the mixture of hydrogen and oxygen may be critical to the efficient operation of a torch having a small orifice through which the fuel mixture must pass in a uniform and constant stream of flow rate.

It will be obvious to those skilled in the art that various modification of the present invention may be resorted to in a manner limited only by a just interpretation of the following claims.

I claim:

1. A method of producing and burning a dry homogeneously mixed hydrogen and oxygen fuel gas for torches consisting of electrolytically decomposing an aqueous electrolyte and producing a mixture of hydrogen and oxygen, then passing said mixture of hydrogen and oxygen through a water collector to remove water vapor therefrom, then conducting said mixture of hydrogen and oxygen through a small diameter torch orifice ranging in diameter from .003 inch to .050 inch, and then creating combustion of the dry mixture to produce a high velocity high temperature flame.

2. A method of producing and burning a dry homogeneously mixed hydrogen and oxygen fuel gas for torches consisting of electrolytically decomposing an aqueous electrolyte and producing a mixture of hydrogen and oxygen, then passing said mixture of hydrogen and oxygen through a water collector casing in relation to a chemical drying agent therein to remove water vapor therefrom, then conducting said mixture of hydrogen and oxygen through a small diameter torch orifice ranging in diameter from .003 inch to .050 inch, and then creating combustion of the dry mixture to produce a high velocity high temperature flame of small diameter.

References Cited

UNITED STATES PATENTS

| | | | |
|---|---|---|---|
| 308,276 | 12/1884 | Paine | 204—278 X |
| 558,176 | 4/1896 | Huber | 204—278 |
| 2,248,956 | 7/1941 | Carvlin et al. | 48—128 |
| 2,810,455 | 10/1957 | Veltman | 55—35 |

OTHER REFERENCES

Sperr, F. W., Jr.: "Dehydration of Manufactured Gas," American Gas Journal, Nov. 13, 1926, pp. 581–584.

HOWARD S. WILLIAMS, *Primary Examiner.*

JOHN H. MACK, *Examiner.*

D. R. VALENTINE, *Assistant Examiner.*